Aug. 2, 1966          P. P. BIRINGER          3,264,549
STATIC FREQUENCY MULTIPLYING SYSTEM
Filed May 28, 1962                    2 Sheets-Sheet 1
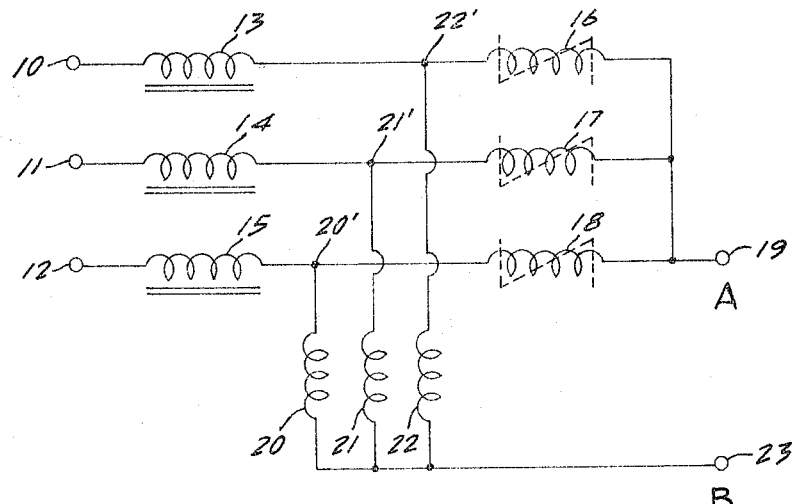
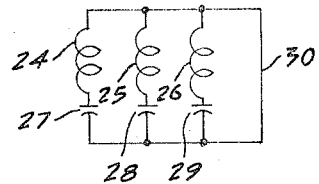
FIG. 1
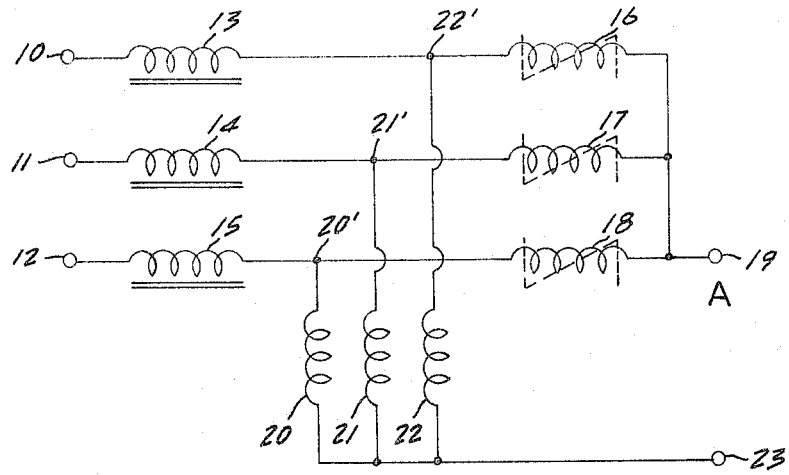
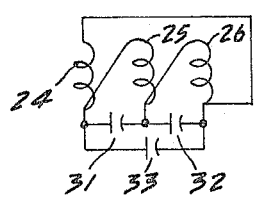
FIG. 2
INVENTOR.
Paul Peter Biringer
BY
J. H. Slough
Attorney

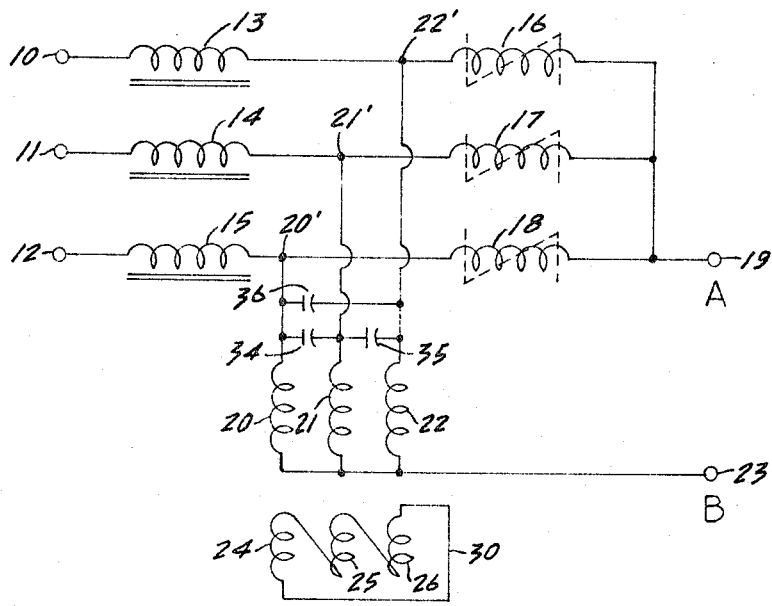
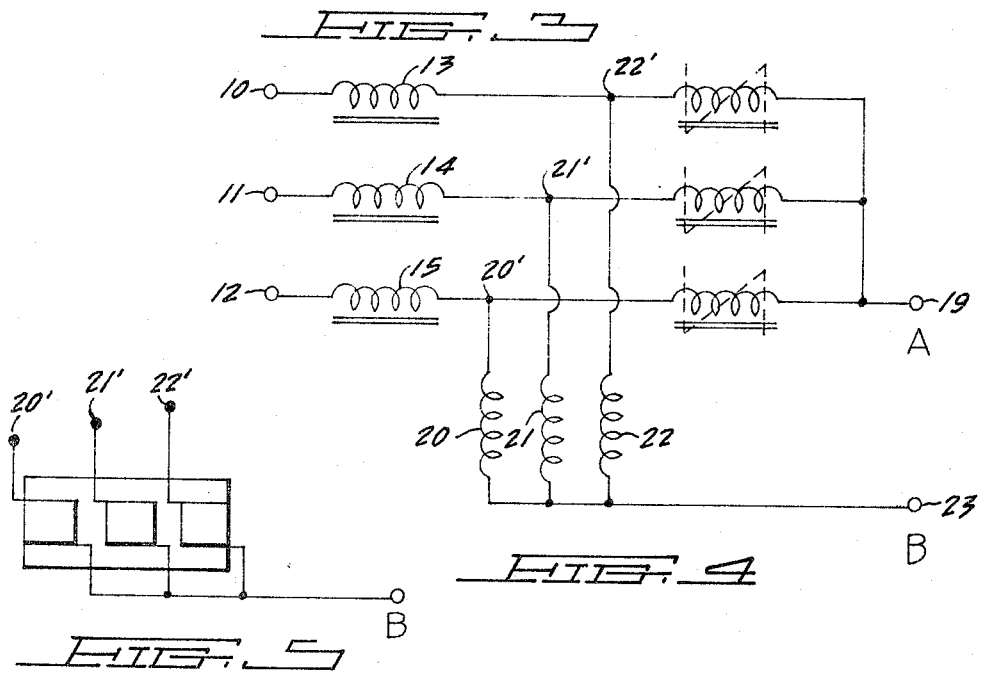
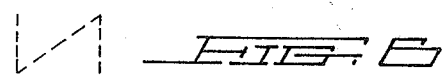
LEGEND
△ NON-LINEAR
FIG. 6
INVENTOR.
Paul Peter Biringer
BY
J. H. Slough
Attorney United States Patent Office
3,264,549
Patented August 2, 1966

3,264,549
STATIC FREQUENCY MULTIPLYING SYSTEM
Paul Peter Biringer, Toronto, Ontario, Canada, assignor to Ajax Magnethermic Corporation, Youngstown, Ohio, a corporation of Ohio
Filed May 28, 1962, Ser. No. 198,352
8 Claims. (Cl. 321—68)

My invention relates to improvements in static frequency multipliers and relates more particularly to that type of multiplier as disclosed in co-pending application Serial No. 713,943 filed February 7, 1958 for which U.S. Letters Patent No. 3,040,230 were granted June 19, 1962 wherein the high frequency power is obtained from a star connection of the current dependent inductances, and an effective neutral point for the source. In said application, alternative effective neutral points were shown; one at the source and the other provided by condenser means interposed phase to phase between linear and non-linear inductances, said condenser means having a neutral point connection.

In the present invention, the effective neutral point is provided by transformer means interposed phase to phase between the linear and non-linear inductances and connected to provide a low impedance path for the third harmonics or odd multiples thereof achieving tripling harmonic potential difference between the star point connection of the non-linear inductances and the effectively neutral point of the said transformer. The transformer in such event becomes a filter for selected harmonics. By use of a transformer according to the invention it is possible additionally to select a desired operating voltage for the condensers which may be different from that of the line voltage by selection of a proper turn ratio in the transformer and disposition of the condensers. Also by appropriate connection the same condensers may be adapted to serve not only for power factor correction of the input, as in the co-pending application referred to, but also for power factor correction of the high frequency single phase output.

The above and other objects will become more readily apparent by reference to the appended description, in which description reference is made to the accompanying drawings, in which drawings:

FIG. 1 illustrates an electrical circuit illustrating a static frequency multiplying system according to my invention;

FIG. 2 illustrates an electrical circuit showing an alternative form of the invention;

FIG. 3 illustrates an electrical circuit showing a further alternative form of the invention;

FIG. 4 illustrates a single three phase transformer structure adapted to be employed in accordance with the invention, the circuit therefor also being illustrated in FIG. 5;

FIG. 6 is a legend of the electrical circuit applied in dotted lines in FIGS. 1 to 4 inclusive to indicate the non-linear elements of the system.

Referring now more particularly to the drawings, in all of which like parts are designated by like reference characters, the terminals of the multiphase source of alternating current are indicated at 10, 11 and 12. In each phase, linear reactances 13, 14 and 15, preferably in the form of chokes, are disposed between the source and a non-linear inductance, i.e. primary structure designated at 16, 17 and 18; said primary structures are connected to a star connection point 19.

In FIGS. 1 to 4 inclusive, three transformer primary windings 20, 21 and 22 are shown, one end of each of the three primary windings shown being connected to a separate phase as at 20′, 21′ and 22′ between the linear and non-linear inductances and the other end of each primary winding being connected to a common point 23.

In FIGS. 1 to 3 inclusive, secondary windings 24, 25 and 26 are magnetically coupled to the primary windings of the three single phase transformers shown therein. In FIG. 1 the secondary winding is connected in parallel through condensers 27, 28, 29 and connected by a lead 30 providing a short circuited path for the third harmonics or odd multiples thereof. In FIGS. 2 and 3 the secondaries are connected in series, condensers 31, 32 and 33 being connected in delta or wye arrangement in FIG. 2, the delta arrangement being shown across the terminals of said secondary windings and being connected in FIG. 3 in delta or wye arrangement across the primaries as indicated at 34, 35 and 36. The series connection of the secondaries in FIGS. 2 and 3 provides a short circuited path for third harmonics and odd multiples thereof similarly to the form of FIG. 1.

In FIG. 4 a three phase transformer is employed as an alternative to the use of three single phase transformers as in FIGS. 1 to 3 inclusive and said transformer does not employ secondary windings but rather provides the low impedance path for the third harmonics and odd multiples thereof by the short circuited connection of the secondary windings. As shown in FIG. 5, a three leg core is employed and each of the three windings is mounted on a separate leg of said core. By this arrangement a low impedance path is provided for the third harmonics and odd multiple harmonics.

In each of the forms of the invention illustrated it will be apparent from the above that the star connection point 19 and an effectively neutral point 23 are provided across which the load can be connected, such as an induction heating furnace, and that the low impedance related permits easy circulation of the tripling harmonics in the load circuit; creating a harmonic potential difference between the star point 19 of the non-linear inductances and the effectively neutral point 23 of the transformer or transformers. It is noted that the linear reactances provide a high impedance path for the reflected harmonic currents, that the linear reactances develop non-sinusoidal voltages phase to phase across the points 20′ 21′ and 22′, that the low impedance path in this invention is provided by a selective filtering of the desired tripling harmonics either by employing secondary windings on three single phase transformers as shown in FIGS. 1 to 3, or by using a three leg single core structure, as shown in FIGS. 4 and 5, wherein the static frequency multiplier balanced system of the inventor's prior application Serial No. 725,004, filed March 31, 1958 for which U.S. Letters Patent No. 3,040,231 were granted June 19, 1962, is achieved by the use of source transformer means rather than by the utilization of secondary windings coupled to the non-linear inductances as shown in that application, or the use of condensers alone or a neutral point at the source as in co-pending application Serial No. 713,943, filed February 7, 1958.

Normally, symmetrical three-phase transformers, if used in a balanced tripler system, would provide a high impedance path for all harmonics. However, by use of certain specific means illustrated in the drawings and described herein, the impedance of such transformers is reduced so substantially with respect to the tripling harmonics as to become low impedance devices with respect to said tripling harmonics. They nevertheless continue to function as high impedance devices with respect to other harmonics, however, such as the fundamental, seventh, eleventh, etc. harmonics and prevent their presence in the load or output circuit.

Referring now more particularly to the form of the invention shown in FIG. 3, three separate unsaturated core structures or transformers 20, 21, 22 are shown. Normally as recited above, such primary structures would provide a high impedance path for all currents and carry only magnetizing currents of the odd harmonic frequencies. However, when as shown, secondary windings, in series connection, are magnetically coupled to such primary structures said secondaries present an infinitely high impedance path for all the harmonic currents which are of the order 1, 5, 7, etc. Since in three phase power systems the tripling harmonics are all in time phase, the secondary windings, as shown, yield a direct short circuit for these tripling harmonics which, because of the magnetic coupling to the primary structures, transfers to the other side of the transformers or primary structures and reduces the said inherent high impedance of the primary structures thus permitting the tripling harmonics to freely circulate in the load circuit.

In the form of the invention shown in FIG. 2 the same type of transformers as shown in FIG. 3 are employed but in this form, condensers 31, 32, 33 are connected phase to phase across the secondary terminals, rather than across the primary terminals, as shown in FIG. 3 but the same operating result is obtained. However, by such positioning an additional result may be obtained viz in the event the line voltage is low, the line power factor corrections required can be obtained at the higher voltage levels present in the secondaries and less expensive, more compact condensers can be used.

The form of FIG. 1 differs from that of FIGS. 2 and 3 insofar as it utilizes secondary windings and condensers in series therewith, said secondary winding and series connected condensers being connected in parallel. In this system, each of the parallel connections will carry all harmonic currents, 1, 3, 5, 7, 9 etc. and the condensers thereof actively participate in the correction of the primary power factor. The short circuit 30 will short only the tripling harmonic frequencies thus reducing the impedance afforded by the transformer thereto. It will be noted that since the condensers, which are low impedance means, carry the tripling harmonics in addition to the other odd harmonics, they act not only as in the other forms to improve the power factor on the input side of the system, but also to improve the power factor on the output side.

In using the power system of the present invention in connection with induction heating furnaces, it may be observed that these furnaces have a very low inductive power factor and require a great amount of capacitive compensation, and the capacitors 27, 28, 29 in form of FIG. 1 supply a certain amount of this compensation.

In the system of FIG. 4, a three-leg transformer of the type shown in FIG. 5 is used. It will be noted that there are no secondary windings used in this form, that one terminal of each primary structure 20, 21, 22 is connected to a separate phase, as at 20', 21' and 22', and that the opposite terminals of each winding are connected to a common effectively neutral point 23. In this form, a separate lead or short circuited path is not provided as in the other forms herein. However since the core configuration in this form does not permit free circulation of the tripling harmonic flux, the primary structures act as low impedance paths therefor, and create a potential differential of tripling harmonics between the star connection point 19 of the non-linear inductances 16, 17, 18 and the said effective neutral point 23.

Although I have described my invention in connection with certain specific embodiments, numerous and extensive departures may be made therein, such as use of various type of connections and primary structures, without however departing from the spirit of my invention or the scope of the appended claims.

What I claim is:

1. A static frequency multiplier having an alternating current multiphase source, linear reactances interposed between non-linear inductances and the corresponding phase of said source, a star connection point connecting the non-linear inductances, transformers having primary structures, said transformers interposed between said linear reactances and non-linear inductances, said primary structures being connected to separate phases of said source by end windings, said primary structures being connected by another portion of their windings to a common point, said transformers providing a low impedance path for single phase third harmonic currents or multiples thereof and having an effectively neutral point creating a potential difference between said star connection point and said effectively neutral point, a load being located between said points.

2. A static frequency multiplier having an alternating current multiphase source, linear reactances interposed between non-linear inductances and the corresponding phase of said source, a star connection point connecting the non-linear inductances, transformers having primary structures, said transformers interposed between said linear reactances and non-linear inductances, said primary structures being connected to separate phases of said source by end windings, said primary structures being connected by another portion of their windings to a common point, secondary windings magnetically coupled to the primary structures of said transformers providing a low impedance path for single phase third harmonic currents or mutliples thereof and having an effectively neutral point creating a potential difference between said star connection point and said effectively neutral point, a load being located between said points.

3. A static frequency multiplier having an alternating current multiphase source, linear reactances interposed between non-linear inductances and the corresponding phase of said source, a star connection point connecting the non-linear inductances, transformers having primary structures, said transformers interposed between said linear reactances and non-linear inductances, said primary structures being connected to separate phases of said source by end windings, said primary structures being connected by another portion of their windings to a common point, secondary windings connected in parallel through condensers disposed across the terminals of said windings, said secondary windings being magnetically coupled to the primary structures of said transformers providing a low impedance path for single phase third harmonic currents or multiples thereof and having an effectively neutral point creating a potential difference between said star connection point and said effectively neutral point, a load being located between said points.

4. A static frequency multiplier having an alternating current multiphase source, linear reactances interposed between non-linear inductances and the corresponding phase of said source, a star connection point connecting the non-linear inductances, transformers having primary structures, said transformers interposed between said linear reactances and non-linear inductances, said primary structures being connected to separate phases of said source by end windings, said primary structures being connected by another portion of their windings to a common point, secondary windings connected in parallel through condensers disposed across the terminals of said windings, said secondary windings being magnetically coupled to the primary structures of said transformers providing a short circuited path for single phase third harmonic currents or multiples thereof and having an effectively neutral point creating a potential difference between said star connection point and said effectively neutral point, a load being located between said points.

5. A static frequency multiplier having an alternating current multiphase source, linear reactances interposed between non-linear inductances and the corresponding phase of said source, a star connection point connecting the non-linear inductances, transformers having primary structures, said transformers interposed between said linear reactances and non-linear inductances, said primary structures being connected to separate phases of said source by end windings, said primary structures being connected by another portion of their windings to a common point, condensers interposed between the said primary structures for providing a low impedance path for single phase harmonic currents passing non-sinusoidal current to said primary structures, secondary windings connected in series, said secondary winding being magnetically coupled to the primary structures of said transformers and providing a short circuited path for single phase third harmonic currents or multiples thereof and having an effectively neutral point creating a potential difference between said star connection point and said effectively neutral point, a load being located between said points.

6. A static frequency multiplier having an alternating current multiphase source, linear reactances interposed between non-linear inductances and the corresponding phase of said source, a star connection point connecting the non-linear inductances, a three-phase transformer, said transformer interposed between said linear reactances and non-linear inductances said transformer being connected to separate phases of said source by end windings, primary structures being connected by another portion of their windings to a common point, said transformer providing a low impedance path for single phase third harmonic currents or multiples thereof and having an effectively neutral point creating a potential difference between said star connection point and said effectively neutral point, a load being located between said points.

7. A static frequency multiplier having an alternating current multiphase source, linear reactances interposed between non-linear inductances and the corresponding phase of said source providing a high impedance path for harmonic components of the frequency reflected by said non-linear inductances, a star connection point connecting the non-linear inductances, said linear reactances developing non-sinusoidal voltages between said linear reactances and said non-linear inductances, transformer means interposed between the said linear reactances and said non-linear inductances and being connected to separate phases of said source by end windings providing a low impedance path for tripling harmonic currents passing non-sinusoidal current to said non-linear inductances and a high impedance path with respect to other harmonics, said transformer means having an effectively neutral point creating a potential difference between said star connection point and effectively neutral point.

8. A static frequency multiplier having a multiphase source of alternating current of predetermined frequency and adapted to deliver a single phase output comprising in combination: a primary structure for each phase of said source energizable by the latter having a current voltage relationship which is non-linear for each phase of said source; a reactance having a current voltage relationship which is linear disposed between said primary structure and the corresponding phase of said source providing a high impedance path for harmonic components of said frequency reflected by said primary structures; said linear reactances developing non-sinusoidal voltages between said linear reactances and said primary structures, transformers interposed between said primary structures and said linear reactances and being connected to separate phases of said source by end windings for providing a low impedance path for harmonic currents passing non-sinusoidal current to said primary structures; secondary windings magnetically coupled to each primary structure of said transformers and connected to a short circuit, the tripling harmonics passing these to the primary structures of the transformers reducing the impedance thereof and permitting the same to freely circulate in the load circuit.

References Cited by the Examiner
UNITED STATES PATENTS 2,451,189    10/1948    Alexanderson et al. ___ 321—69

JOHN F. COUCH, *Primary Examiner.*

LLOYD McCOLLUM, *Examiner.*

G. J. BUDOCK, G. GOLDBERG, *Assistant Examiners.*